United States Patent [19]

Bricker

[11] Patent Number: 4,629,132
[45] Date of Patent: Dec. 16, 1986

[54] SHREDDER ATTACHMENT FOR A FOOD PROCESSOR

[75] Inventor: Melvin E. Bricker, Cincinnati, Ohio

[73] Assignee: Bricker Products, Inc., Cincinnati, Ohio

[21] Appl. No.: 734,909

[22] Filed: May 16, 1985

[51] Int. Cl.⁴ ............................................ B02C 25/00
[52] U.S. Cl. ...................................... 241/37.5; 241/92
[58] Field of Search ............... 241/92, 167, 273.1, 241/273.2, 273.3, 273.4, 285 R, 285 B, 37.5

[56] References Cited

U.S. PATENT DOCUMENTS

| | | | |
|---|---|---|---|
| 2,590,909 | 4/1952 | Westby et al. | 241/92 X |
| 3,415,457 | 12/1968 | Echols | 241/92 |
| 4,520,964 | 6/1985 | Rossler | 241/92 X |

Primary Examiner—Mark Rosenbaum
Attorney, Agent, or Firm—Wood, Herron & Evans

[57] ABSTRACT

A food processor having a shredder attachment for shredding or slicing food product against a rotating slicer plate includes a pusher plate releasably connected to a feed chute by a removable handle which prevents disassembly of the pusher plate for cleaning unless the feed chute is in a non-operating position. A splitter in the form of a knife-edge projection is positioned in the feed chute to direct food product to the periphery of the slicer plate while slicing food product pushed thereagainst. A slicer plate holder achieves improved discharge of shredded food product from a housing containing the slicer plate by providing a number of spaced wiper blades which scrape or wipe the interior surfaces of the housing, and an outer ring which also directs food product out of the housing. The slicer plate holder also includes a hub for covering a bearing, which bearing drivingly connects the hub to the food processor power unit, so as to prevent food product from contacting the bearing.

9 Claims, 4 Drawing Figures

SHREDDER ATTACHMENT FOR A FOOD PROCESSOR

BACKGROUND OF THE INVENTION

This invention relates to food processors, and, more particularly, to a food processor having a shredder attachment for cutting and shredding food product.

Commercial food processors for shredding food products such as cabbage and other vegetables generally comprise a housing, a circular slicer plate disposed within the housing which is mounted to a rotatable plate holder drivingly connected to a power unit, and a feed chute for receiving food product to be processed. A pusher plate, movable within the feed chute, pushes the food product into the housing and against the rotating slicer plate for cutting and shredding of the food product. The shredded food product is then expelled from the housing through an opening at the bottom which leads to a discharge chute emptying into a bucket.

In most prior art food processors, the slicer plate is a circular metal plate in which a plurality of shredder blades are formed by bending small, spaced sections of metal above the plane of the plate by a punching operation forming a hole behind each blade. The shredder blades slice the food product into strips which pass through the holes to the opposite face of the plate. In order to achieve maximum efficiency, it is desirable to direct the food product from the feed chute toward the outer periphery of the slicer plate because the hub of the plate holder is mounted to the center portion of the slicer plate and tends to interfere with the food product shredded thereat. This has been accomplished in prior art food processors by mounting the feed chute onto the housing so that it is offset from the center of the slicer plate, and also by including a rounded projection at one side of the feed chute. The rounded projection was intended to engage the food product as it moves down the chute and direct it toward the outer periphery of the slicer plate.

Prior art feed chutes of this type have created several problems. For example, food products having a dimension approximately equal to the transverse dimension of the feed chute required substantial pressure to push them over the rounded projection and against the slicer plate. This frequently resulted in the formation of cut strands of product which were too irregular for use. In addition, food products such as cabbage heads were crushed and bruised against the feed chute with the exertion of substantial force by the pusher plate. Moreover, it has proven difficult to obtain a tight seal between the rounded projection and pusher plate as the pusher plate advances the food product toward the slicer plate. This often resulted in the expulsion of shredded product up the feed chute from the housing, instead of out the discharge chute.

Another problem with prior art food processors has been the accumulation of shredded product within the housing. In most designs, the housing is generally rectangular in shape with planar interior surfaces and right angle corners. Food product shredded in the housing was typically thrown radially outwardly to the outer surfaces and corners of the housing due to the centrifugal force produced by the rotating slicer plate and its support plate. Prior art food processors included no means for clearing shredded food product from the outer surfaces and corners of the housing while the machine was operating. In order to clear the housing, prior art food processors must be shut down and the shredded product removed by hand. This results in substantial operating delays and lost efficiency.

A further problem with many prior art food processors was the occasional leakage of oil or grease from a bearing which drivingly connects the hub of the plate holder to the drive shaft of a power unit. Vegetables such as cabbage and the like contain water which is liberated when the product is shredded. The water accumulates within the housing during the shredding operation and at times is thrown against the hub bearing. In prior art food processors, the water was allowed to splash directly into the hub bearing and wash away some of the grease which then flowed into the housing and combined with the shredded food product. This wastes all of the shredded product and required substantial down time for maintenance.

SUMMARY OF THE INVENTION

It is therefore among the objects of this invention to provide a food processor having an improved shredder attachment.

It is another object of this invention to provide a food processor having means for directing food product against the periphery of a slicer plate with minimum jamming or binding.

It is a further object of this invention to provide a shredder attachment for a food processor having means for automatically clearing shredded product from the interior of a housing during operation of the food processor.

It is a still further object of this invention to provide a shredder attachment for a food processor having means to prevent leakage of lubricant into the housing and food products.

It is still another object of this invention to provide a shredder attachment having a pusher plate movable within a feed chute, including means for permitting disassembly of the pusher plate from the shredder attachment for cleaning or maintenance only when the shredder attachment is not operational.

These objects are accomplished in a food processor having a shredder attachment according to this invention including a housing, a circular slicer plate disposed within the housing and mounted for rotation to a plate holder, a feed chute pivotally mounted to the housing and communicating with the slicer plate and a pusher plate movable within the feed chute for pushing food product deposited within the feed chute against the slicer plate for shredding. Food product such as cabbage is loaded into the feed chute and directed therethrough toward the outer periphery of the slicer plate by the pusher plate. The slicer plate is rotatable to shred or slice the food product upon contact, and the shredded food product is then directed through an opening in the bottom of the housing into a discharge chute.

In one aspect of this invention, the feed chute and pusher plate cooperate to direct food product toward the outer periphery of the circular slicer plate to produce shredded food product of consistent size and length. The feed chute is mounted to the housing offset from the center of rotation of the slicer plate so that food product exiting the feed chute is initially directed toward the outer periphery of the slicer plate. Movement of the food product to the outer periphery of the slicer plate is also assisted by a splitter in the form of a knife-edge projection mounted to the side of the feed chute which is closest to the center of rotation of the slicer plate. The pusher plate is formed with a slot adapted to closely receive the splitter.

The splitter engages food product as it is pushed along the chute by the pusher plate and directs such food product outwardly away from the center of rotation of the slicer plate and toward its outer periphery. Unlike the rounded projections mounted to feed chutes of prior art food processors, the knife-edge projection of the splitter slices through the food product while urging it outwardly toward the outer periphery of the slicer plate. This avoids binding of the food product within the feed chute allowing more uniform pressure to be applied by the pusher plate. In addition, by cleanly slicing through the food product, crushing and bruising of articles such as cabbage heads is avoided. Moreover, the relatively close fit between the knife-edge projection and slot in the pusher plate prevents shredded food from moving back up the feed chute from the housing.

In another aspect of this invention, an improved plate holder is provided for rotatably mounting the slicer plate within the housing. The plate holder is formed with an outer ring having a tapered or wedge-shaped cross section which is connected to the outer periphery of the slicer plate. A plurality of spaced vanes or wiper blades extend radially inwardly from the outer ring to a central hub having a bearing. The hub is drivingly connected by the bearing to the drive shaft of a conventional power unit, and mounts to the center portion of the slicer plate.

The configuration of the plate holder of this invention provides several advantages. First, at least a portion of the vanes or wiper plates mounted between the outer ring and hub have a transverse dimension approximately equal to the width of the housing so that the wiper blades nearly touch the interior walls of the housing while rotating. The wiper blades function to scrape or wipe shredded product from the inner surfaces of the housing and force it by centrifugal force out of the housing and into the discharge chute. This greatly reduces the down time associated with prior art food processors which was required to manually remove shredded product accumulated in the housing. The wiper blades of the plate holder of this invention clear the interior surfaces of the housing of shredded food product, and discharge it into the feed chute, while the food processor is operating.

Another advantage of the plate holder of this invention results from the configuration of the central hub. In a presently preferred embodiment, the hub is tapered so that its cross section increases from the slicer plate toward the rear wall or panel of the housing. The largest transverse dimension of the hub is in the area of the bearing which mounts the hub to the drive shaft of the food processor power unit. Water or other liquids which are liberated from the food product as it is shredded are directed away from the bearing by the tapered outer surface of the hub. This creates an effective seal of the bearing to eliminate the leakage of bearing lubricant into the housing and food product discharged therefrom.

In still another aspect of this invention, an improved handle for moving the pusher plate within the feed chute is provided. As with other commercial cutting and shredding machinery, it is desirable to provide safety features in food processors to avoid accidents, which might occur, for example, if the pusher plate was permitted to separate from the feed chute while the food processor was operating. In order to assure the operator's safety, and in order to provide easy disassembly for cleaning, an improved handle and handle mount is provided.

The handle of this invention includes a rod formed with a key which mates with a keyway or slot formed in a sleeve mounted atop the pusher plate. The sleeve is insertable between a pair of spaced ears or brackets mounted to the feed chute. One of the brackets is formed with a slot which receives the key formed on the exterior surface of the handle rod. The handle rod is also formed with a stop which is movable within a notch formed at the top surface of the pusher plate.

In the normal operation of the food processor, with the feed chute mounted against the housing, the pusher plate is movable upwardly out of the feed chute so that food product can be fed into the feed chute, and downwardly into the feed chute to push food product against the slicer plate. The extent of upward movement of the pusher plate is limited by the engagement of the stop on the handle rod with an upper surface of the housing. This feature prevents the disengagement of the handle and pusher plate from the feed chute with the feed chute in a closed position against the housing.

The only way the handle and pusher plate can be connected to or removed from the feed chute is to pivot the feed chute to an open position, spaced from the housing, when the food processor is not operating. With the feed chute open, the stop on the handle rod can no longer contact the housing allowing the handle and feed chute to be pivoted upwardly to a position wherein the key on the handle rod aligns with the slot in the bracket at the end of the mounting sleeve. If the feed chute is mounted to the housing, the stop prevents the handle from being pivoted upwardly to a point where the slot in the bracket aligns with the key on the handle rod. The handle and handle mount of this invention thus prevents removal of the pusher plate and handle from the feed chute except when the feed chute is pivoted to an open, non-operational position to assure safe operation of the pusher plate herein.

DESCRIPTION OF THE DRAWINGS

The structure, operation and advantages of a presently preferred embodiment of this invention will become further apparent upon consideration of the following description, taken in conjunction with the accompanying drawings, wherein.

DETAILED DESCRIPTION OF THE INVENTION

Figure 1:
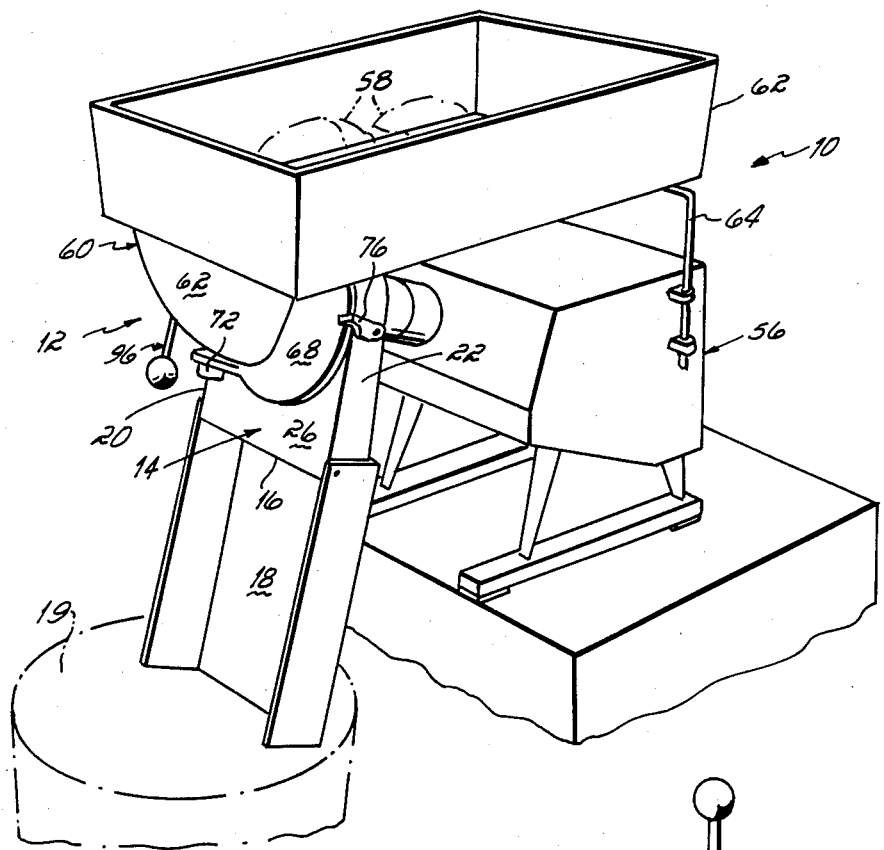
FIG. 1 is a perspective view of a food processor incorporating the shredder attachment of this invention.
Figure 2:
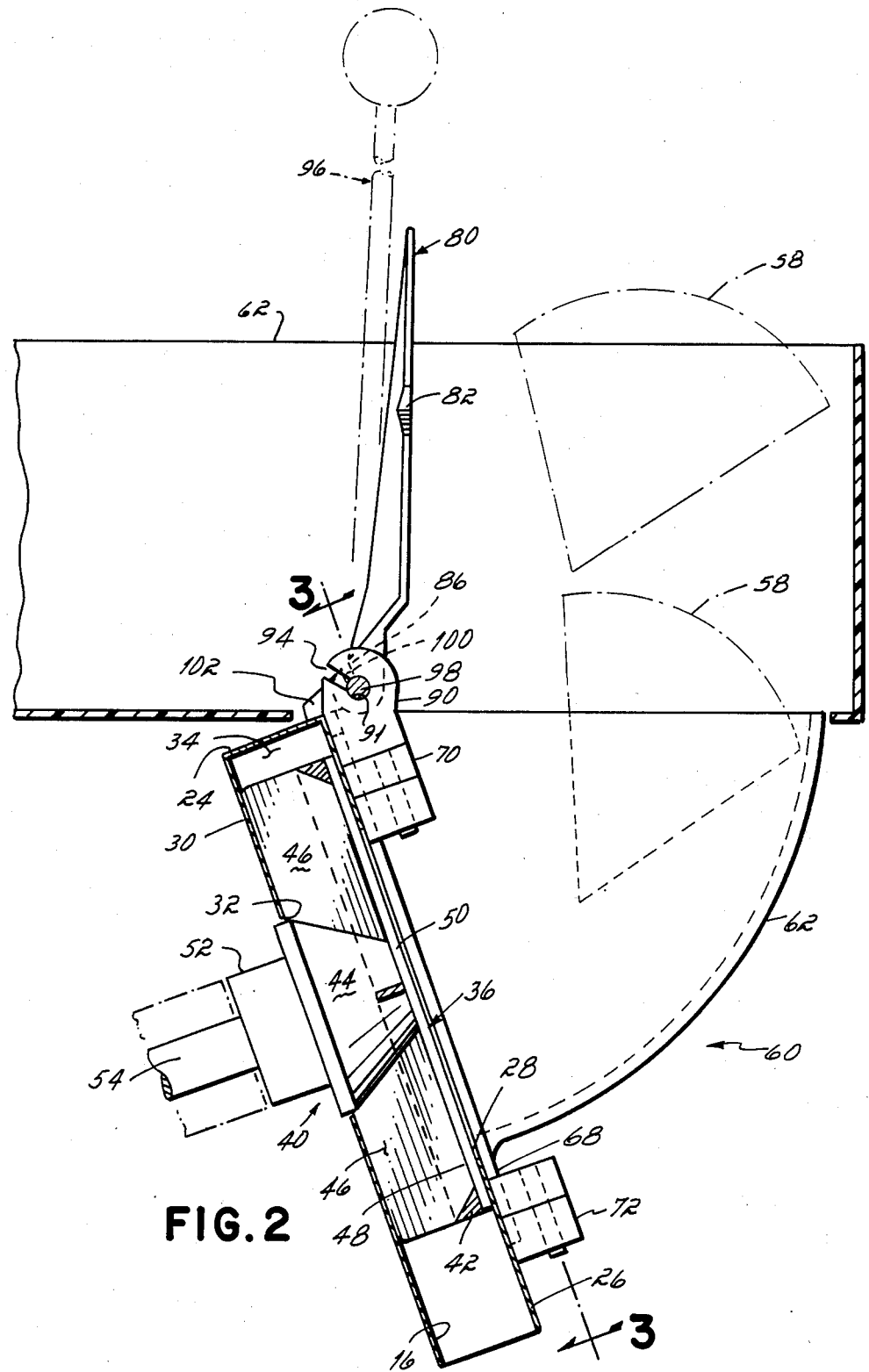
FIG. 2 is a side elevational view in partial section of the shredder attachment herein as seen from the back side of FIG. 1.

Referring now to FIGS. 1 and 2, a food processor 10 is shown with a shredder attachment 12 according to this invention. The shredder attachment 12 includes a housing 14 which is generally rectangular in shape having an open bottom 16 adapted to mount a discharge chute 18 which empties into a container 19. The housing 14 is formed with opposed side panels 20, 22, a top panel 24, a front panel 26 having an opening 28, and a rear panel 30 having an opening 32, all of which are interconnected to define a hollow interior 34.

A circular slicer plate 36, having a plurality of cutter blades 38 along its forward surface, is mounted for rotation proximate the front panel 26 of housing 14 by a plate support 40. The plate support 40 includes an outer ring 42 having a wedge-shaped cross section, a cone-shaped hub 44 and a number of vanes of wiper blades 46 mounted between the outer ring 42 and hub 44. The slicer plate 36 includes an outer periphery 48 mounted to the outer ring 42, and a center section 50 mounted to the hub 44. The cone-shaped hub 44 tapers radially outwardly from the slicer plate 36 to the opening 32 in rear panel 30 where it is drivingly connected by a bearing (not shown) to a coupling 52 and a drive shaft 54. The drive shaft 54 is rotated by a power unit 56 of the type disclosed in U.S. Pat. No. 3,759,129 to Bricker et al, which is incorporated by reference in its entirety herein. As discussed in more detail below, the slicer plate 36 is rotatable with the plate support 40 within the housing 14 to shred food product 58, such as cabbages, and discharge the shredded food product 58 through the discharge chute 18 and into the container 19.

The food product 58 is fed into the housing 14 through a feed chute 60, and is pushed against slicer plate 36 for shredding by a pusher plate 80, described in more detail below. The feed chute 60 includes an arcuate neck portion 62 which communicates at one end with a hopper 62 filled with food product 58. The hopper 62 is supported at one end by the feed chute 60 and at the opposite end by support legs 64 which extend upwardly from the power unit 56. The opposite end of the arcuate neck 62 is connected to a mounting plate 68 which is pivotally mounted to the front panel 26 by hinges 70, 72. As described in more detail below, the feed chute 60 is pivotal between a closed position against the front panel 26, and an open position spaced from front panel 26 as seen in FIG. 4.

The mounting plate 68 is formed with an opening 74 which at least partially covers the opening 28 in front panel 26 when the feed chute 60 is pivoted to a closed position against the housing 14 as shown in FIG. 1. A catch 76 maintains the feed chute 60 in a closed position, which may include a switch or other suitable means (not shown) electrically connected to the power unit 56 so that the power unit 56 is operable only when the feed chute 60 is closed.

Figure 3:
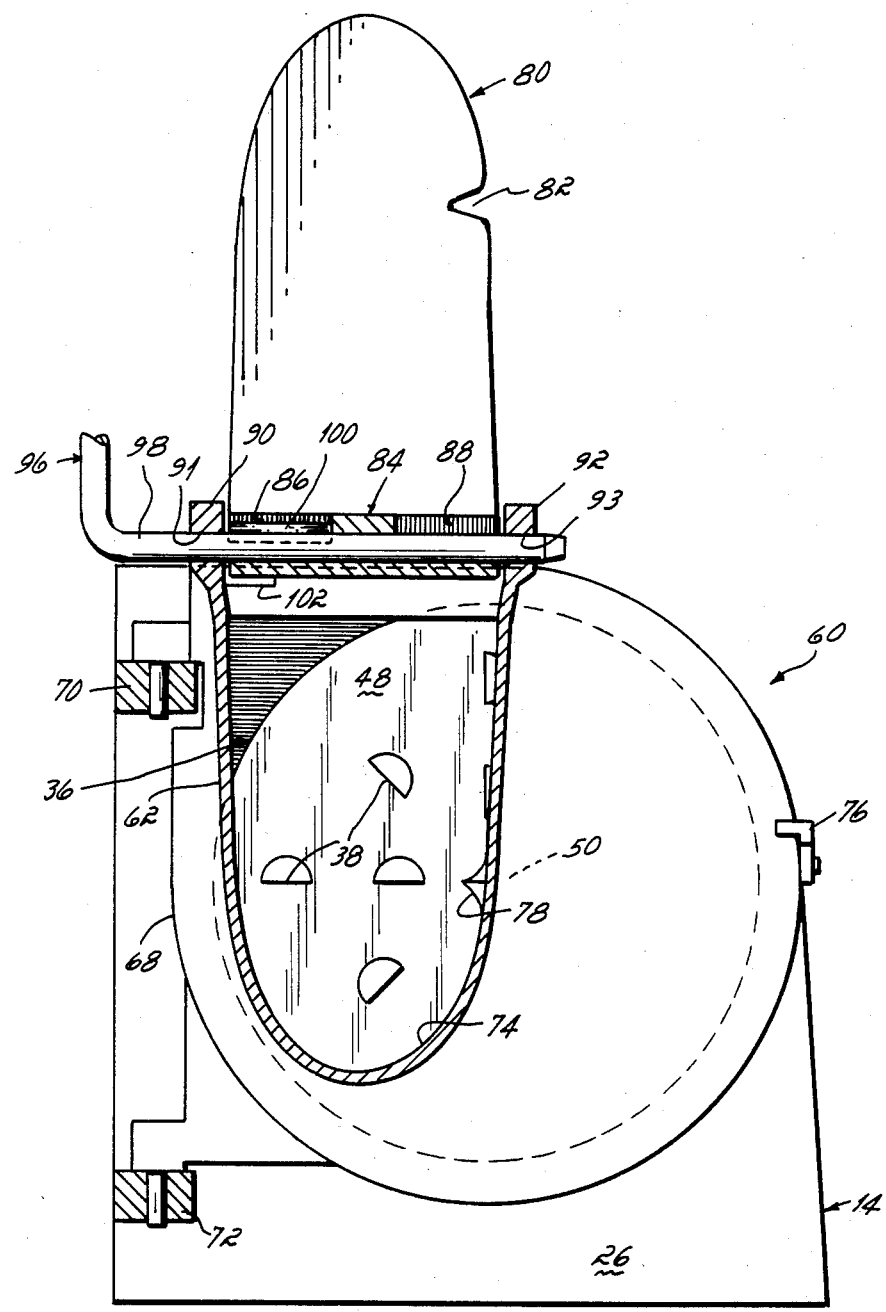
FIG. 3 is a cross-sectional view, in partial elevation, taken generally along line 3—3 of FIG. 2.

As shown in FIGS. 2 and 3, the opening 74 in feed chute 60 is offset relative to the center of rotation or center section 50 of slicer plate 36. This is to help ensure that food product 58 pushed into the housing 14 from feed chute 60 contacts the outer periphery 48 of the slicer plate 36 to produce shredded or sliced product of consistent size and shape. Movement of the food product 58 to the outer periphery 48 of slicer plate 36 is also assisted by a splitter 78 in the form of a knife-edge projection which is mounted to the side of the neck 62 of feed chute 60 closest to the center section 50 of slicer plate 36. As the food product 58 pushed along the feed chute neck 62 by pusher plate 80 contacts the splitter 78, it is urged outwardly toward the outer periphery 48 of slicer plate 36. Since the splitter 78 is formed with a knife edge, it slices through the food product 58 upon contact. This prevents binding of the food product 58 within the feed chute neck 66, and allows for the even application of pressure by the pusher plate 80. In addition, the splitter 78 prevents food product 58 such as cabbage from becoming crushed or bruised against the feed chute 60 or pusher plate 80 which improves the finished, shredded product.

Figure 4:
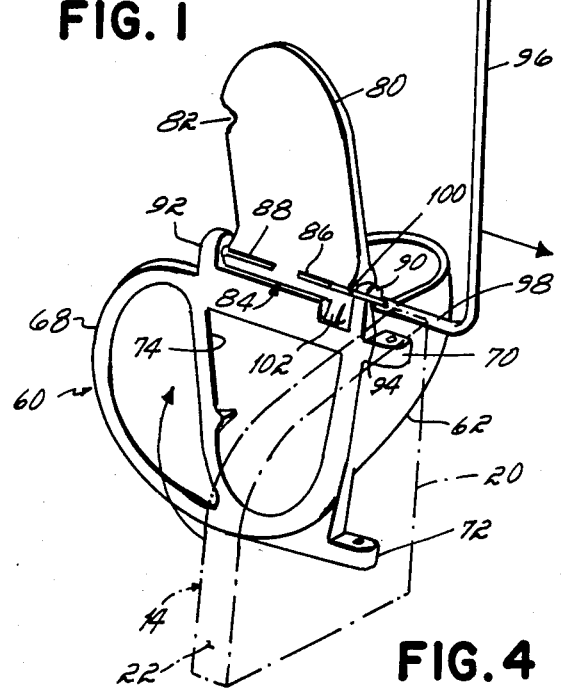
FIG. 4 is a partial schematic perspective view from the back side of FIG. 1 showing the shredder chute in an open position and the pusher plate and handle upright in a position for removal.

Referring now to FIGS. 2-4, the structure and operation of pusher plate 80 is illustrated. The pusher plate 80 is a solid, generally U-shaped member having the same cross section as the neck 66 of feed chute 60. The pusher plate 80 is movable upwardly out of the feed chute 60 so that food product 58 can be fed into the feed chute neck 62, and downwardly along the neck 62 to push food product 58 into the housing 14 and against the slicer plate 36. The pusher plate 80 is formed with a notch 82 which closely receives the splitter 78 projecting from the side wall of feed chute neck 62 to prevent food product 58 from moving upwardly along the feed chute neck 66 after it has been shredded.

The top surface of pusher plate 80 is formed with a sleeve 84 having a pair of spaced keyways or slots 86, 88 at either end. The sleeve 84 is received between a pair of spaced brackets 90, 92, each formed with a throughbore 91, 93, respectively, which are mounted to the feed chute 60. Bracket 90 includes a slot 94 extending from its outer periphery to its central thoughbore 91.

A handle 96 for pivoting pusher plate 80 with respect to feed chute 60 includes a rod 98 having a key 100 and a projection or stop 102 mounted to its exterior surface. The rod 98 is insertable through the bracket 90, into the sleeve 84 and through the other ear 92 so that the key 100 engages the slot 86 in sleeve 84, and the stop 102 is received within a notch 104 formed in the feed chute 60. The pusher plate 80 is pivotal with the handle 96 for pushing food product 58 along the feed chute neck 66.

In order to ensure operator safety, the connection between the pusher plate 80 and handle 96 is designed to permit removal of handle 96 only when the feed chute 60 is pivoted to an open position away from the front panel 26 of housing 14, when the food processor 10 is not operating. As shown in FIG. 4, the pusher plate 80 must be pivoted to a completely upright position with respect to feed chute 60 in order for the slots 86, 88 in sleeve 84 to align with the slot 94 in bracket 90 so that the key 100 of rod 98 can slide through the bracket slot 94 and then seat within the slot 86 in sleeve 84 for mounting the handle 96 to the pusher plate 80. The pusher plate 80 may only be raised to a position for receipt of handle 96 when the feed chute 60 is in the open position, away from front panel 26 of housing 14. As shown in FIG. 2, if the feed chute 60 is closed, the pusher plate 80 can be pivoted upwardly only to a limited extent because the stop 102 mounted to rod 98 engages the top panel 24 of the housing 14. In this uppermost position of pusher plate 80, with the feed chute 60 closed, the key 100 of rod 98 does not align with the slot 94 in bracket 90 which therefore prevents disengagement of the handle 96 from sleeve 84.

The pusher plate 80 may be removed from or mounted to feed chute 60 only by swinging feed chute 62 to an open position, as in FIG. 4, and then pivoting handle 96 upwardly beyond the movement permitted with the feed chute 60 closed. By opening the feed chute 60, the pusher plate 80 can be pivoted upwardly so as to align the rod key 100 with the slot 94 in bracket 90. This permits removal of the handle 96 from the sleeve 84, and, in turn, removal of the pusher plate 80 from the feed chute 60 for cleaning or maintenance.

The operation of shredder attachment 12 in the cutting or shredding of food product 58 proceeds as follows. The hopper 62 is loaded with food product 58 such as cabbage or other vegetables. The feed chute 60 is placed in a closed position against front panel 26 and is secured in place by the catch 76 so that the circuit to the power unit 56 is completed. The pusher plate 80 is pivoted upwardly to the position shown in FIG. 2 to permit the food product 58 to pass from the hopper 62 and into the neck 62 of feed chute 60. The pusher plate 80 is then pivoted downwardly along the feed chute neck 66 to push the food product 58 into the housing 14 and against the slicer plate 36. As described above, the splitter 78 projecting from the feed chute neck 62 urges the food product 58 toward the outer periphery 48 of slicer plate 36 to assure that the food product 58 is properly cut.

The food product 58 shredded by the rotating slicer plate 36 is thrown by centrifugal force toward the open bottom 16 of housing 14 and into the discharge chute 18. In order to prevent an accumulation of shredded product along the interior 34 of housing 14, the wiper blades 46 extend closely adjacent its front and rear panels 26, 30. The wiper blades 46 function to scrape or wipe shredded food product from the interior 34 of housing 14 and direct it into the discharge chute 18. The wedge-shaped cross section of the outer ring 42 also aids in directing shredded food product from the outer surfaces of housing 14 toward and discharge chute 18.

During the shredding process, juices such as water or other liquids can be liberated from the food product 58. Such liquids must be prevented from entering the bearing (not shown) which mounts the hub 44 to the gear reducer 52 and drive shaft 54. The conical shape of the hub 44 functions to direct any liquid produced in the housing 14 away from the opening 32 at the rear panel 30 where the bearing is located. This prevents the escape of lubricant from the bearing into the housing 14 where it could contaminate the shredded food product 58.

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. In a food processor for shredding food product, a shredder attachment comprising:
   a housing;
   a slicer plate rotatable within said housing for slicing food product;
   a feed chute operably and removably mounted to said housing for receiving and directing food product toward said slicer plate;
   a pusher plate movable within said feed chute for urging food product toward said slicer plate;
   handle means releasably connected to said pusher plate and rotatably and releasably connected to said feed chute for moving said pusher plate in one direction toward said housing to push food product within said feed chute against said slicer plate for slicing, and for selectively releasing said pusher plate from said feed chute for cleaning;
   stop means on said handle means for restricting the range of movement of said pusher plate and said handle means in an opposite direction beyond a predetermined position when said feed chute is operably mounted on said housing; and
   means preventing release of said handle means from said pusher plate when said handle means is in said predetermined position, and for permitting release of said handle means from said pusher plate upon removal of said feed chute from an operative position with respect to said housing.

2. The shredder attachment of claim 1 in which said feed chute includes spaced brackets, said pusher plate having a sleeve insertable between said brackets, said handle means including a rod insertable through said sleeve and between said brackets for pivotally mounting said pusher plate to said feed chute.

3. The feed attachment of claim 2 further including a keyway in said sleeve, a mating key disposed on said rod and at least one of said brackets being formed with a slot adapted to receive said key, said rod being insertable into said sleeve, with said key mating with said keyway, only upon alignment of said keyway in said sleeve with said slot in said bracket.

4. The feed attachment of claim 3 in which said pusher plate is movable outwardly from said feed chute away from said housing and along said feed chute toward said housing, said stop means being disposed on said handle means for engaging said housing upon movement of said pusher plate outwardly from said feed chute so as to restrict the extent of movement of said pusher plate away from said housing, said slot in said bracket being disposed out of alignment with said key on said rod with said stop in engagement with said housing to prevent removal of said rod from said sleeve when said feed chute is in an operative position with respect to said housing, and
   said slot in said bracket being movable into alignment with said key on said rod to permit removal of said rod from said sleeve upon further motion of said handle in said opposite direction beyond said predetermined position when said feed chute is moved away from an operative position with respect to said housing.

5. In a food processor for shredding food product, a shredder attachment comprising:
   a housing having forward and rearward interior walls spaced apart a predetermined width, and said housing having a discharge opening;
   a feed chute communicating with the interior of said housing, said feed chute being adapted to receive food product;
   a pusher plate movable within said feed chute for pushing food product along said feed chute and into said housing;
   a slicer plate rotatably disposed within said housing;
   slicer plate holder means for rotatably mounting said slicer plate adjacent said forward interior wall of said housing for slicing food product within said housing, said plate holder means including a central hub and an outer ring;
   said plate holder means having wiper blade means radially disposed between said hub and ring and movable along the interior of said housing for directing shredded food product through said discharge opening;

said wiper blade means having a uniform tansverse dimension throughout extending from a forward portion of said housing and said slicer plate mounted therein rearwardly to a position closely adjacent said rearward interior wall of said housing such that a rearward portion of said wiper blade means is substantially parallel to said rearward interior wall of said housing for scraping food product therefrom and directing scraped food product to said discharge opening.

6. The shredder attachment of claim 5 in which said wiper blade means includes a plurality of spaced wiper blades connected between said hub and said outer ring, and said transverse dimension of said blades is approximately equal to the predetermined width of said housing, said wiper blades sweeping sliced food product from the interior of said housing and into said discharge opening.

7. The shredder attachment of claim 5 further including a coupling means for operatively connecting said hub to means for rotating said slicer plate holder means, wherein said hub is conical-shaped from a forward end near said slicer plate to a rearward end near said rearward interior wall of said housing for engaging food product shredded within said housing and for preventing passage of food product within said coupling means.

8. The feed attachment of claim 5 in which said outer ring decreases in cross section from the outer edge thereof toward said central hub.

9. In a food processor for shredding food product, a shredder attachment for a power unit comprising:

a housing including a discharge opening and an interior having a predetermined width;

a slicer plate having an outer periphery, said slicer plate being disposed within said housing for shredding food product;

slicer plate holder means;

coupling means for operatively connecting said slicer plate holder means to a power unit for rotating said slicer plate;

said plate holder means including wiper blade means comprising at least one wiper blade having a transverse dimension approximately equal to the width of said housing for scraping food product from interior surfaces thereof and directing shredded food product through said discharge opening;

said plate holder means including a hub, said hub having a tapered outer surface for preventing passage of food product within said coupling means;

a feed chute communicating with the interior of said housing for conducting food product toward said slicer plate;

a pusher plate movable within said feed chute for pushing food product through said feed chute and toward said slicer plate for shredding;

splitter means mounted within said feed chute for directing food product pushed therealong toward said outer periphery of said slicer plate, and for slicing food product pushed thereagainst;

handle means releasably connected to said pusher plate and rotatably and releasably connected to said feed chute for moving said pusher plate in one direction toward said housing to push food product within said feed chute against said slicer plate for slicing, and for selectively releasing said pusher plate from said feed chute for cleaning;

stop means restricting the range of movement of said pusher plate in an opposite direction beyond a predetermined position, said handle means being prevented in said predetermined position from releasing from said pusher plate; and said feed chute being movable away from said housing to thereby disable said stop means and permit further handle means movement for releasing said handle from said pusher plate.

* * * * *